United States Patent
Wartmann

(10) Patent No.: US 10,281,697 B2
(45) Date of Patent: May 7, 2019

(54) MICROSCOPE FOR THE SPHERICALLY CORRECTED IMAGING OF THREE-DIMENSIONAL OBJECTS

(71) Applicant: Carl Zeiss Microscopy GmbH, Jena (DE)

(72) Inventor: Rolf Wartmann, Waake (DE)

(73) Assignee: Carl Zeiss Microscopy GMBH, Jena (DE)

( * ) Notice: Subject to any disclaimer, the term of this patent is extended or adjusted under 35 U.S.C. 154(b) by 5 days.

(21) Appl. No.: 15/555,086

(22) PCT Filed: Mar. 2, 2016

(86) PCT No.: PCT/EP2016/054430
§ 371 (c)(1),
(2) Date: Sep. 1, 2017

(87) PCT Pub. No.: WO2016/142236
PCT Pub. Date: Sep. 15, 2016

(65) Prior Publication Data
US 2018/0039056 A1   Feb. 8, 2018

(30) Foreign Application Priority Data

Mar. 9, 2015 (DE) .......................... 10 2015 204 134

(51) Int. Cl.
*G02B 21/00* (2006.01)
*G02B 27/00* (2006.01)
*G02B 21/24* (2006.01)

(52) U.S. Cl.
CPC ....... *G02B 21/0016* (2013.01); *G02B 21/006* (2013.01); *G02B 21/241* (2013.01); *G02B 27/0068* (2013.01)

(58) Field of Classification Search
CPC .............. G02B 21/0016; G02B 21/006; G02B 21/241; G02B 27/0068
(Continued)

(56) References Cited

U.S. PATENT DOCUMENTS 5,870,223 A   2/1999   Tomimatsu
6,069,734 A   5/2000   Kawano et al.
(Continued)

FOREIGN PATENT DOCUMENTS

EP   1 161 702      12/2001
WO   WO 00-49447    8/2000

OTHER PUBLICATIONS

International Search Report for PCT/EP2016/054430 dated May 17, 2016.
(Continued)

*Primary Examiner* — Frank G Font
(74) *Attorney, Agent, or Firm* — Nixon Peabody LLP; Jeffrey L. Costellia

(57) ABSTRACT

The invention relates to a system for spherically correcting imaging of a three-dimensional object, comprising a microscope comprising an immersion medium and an embedding medium for holding the three-dimensional object separated from the immersion medium of the microscope by a boundary surface or a cover slip. According to the invention, the thickness ($\Delta s$) of the immersion medium and the position ($\Delta s'$) of the primary intermediate image of the three-dimensional object can be variably modified.

6 Claims, 1 Drawing Sheet

(58) Field of Classification Search
USPC .......................................... 359/379, 382, 383
See application file for complete search history.

(56) References Cited

U.S. PATENT DOCUMENTS

| 7,209,292 | B2* | 4/2007 | Epple ................. G03F 7/70258 |
| | | | 359/379 |
| 2011/0069381 | A1 | 3/2011 | Redford |
| 2014/0055851 | A1 | 2/2014 | Degen et al. |

OTHER PUBLICATIONS

German Written Opinion for PCT/EP2016/054430 dated May 17, 2016.
German International Search Report for 10 2015 204 134.4 dated Aug. 7, 2015.
Notification of Transmittal of Translation of the International Preliminary Report of Patentability, with translation of International Preliminary Report of Patentability, and with translation of Written Opinion of the International Searching Authority for PCT/EP2016/054430, 6 pages, dated Sep. 21, 2017.

\* cited by examiner

MICROSCOPE FOR THE SPHERICALLY CORRECTED IMAGING OF THREE-DIMENSIONAL OBJECTS

CROSS REFERENCE TO RELATED APPLICATIONS

This application claims priority from PCT/EP2016/054430 filed on Mar. 2, 2016, which is hereby incorporated by reference in its entirety.

TECHNICAL FIELD

The invention relates to a microscope for the spherically corrected imaging of three-dimensional objects, comprising an embedding medium for holding the objects that is separated from the immersion medium of the microscope by a boundary surface or a cover slip.

BACKGROUND

Microscope objectives typically are corrected in such a manner that the objects at the boundary layer to the immersion medium are imaged perfectly. Spatially expanded objects, which are not located at this boundary layer, can be captured by moving the microscope objective in the direction of the object. If the embedding medium and the immersion medium have the same refractive index, this imaging process also will yield a perfect image. But if the refractive indices are not identical, which usually is the case, a spherical aberration will occur, which significantly impacts the image quality.

One example for this is the utilization of a 100×/1.4 objective with an oil immersion with a refractive index of 1.518 and an embedding medium with a refractive index of 1.456. If the object is placed directly under a cover slip, it will be imaged perfectly. But if the object is located at a distance of 0.02 mm from the cover slip, the imaging is achieved by moving the objective 0.02205 mm in the direction of the object. However, this image will be of very poor quality due to the great spherical aberration.

Another example is a 20×/0.8 objective in air and an object in water with a refractive index of 1.334. If the object is located at the water surface it will be imaged perfectly. For an object position of 0.06 mm below the water surface, the objective must be moved 0.0405 mm in the direction of the object. This image also will be of very poor quality due to the spherical aberration.

For a third example, a 40×/1.2 objective is used with a water immersion and an object in water. If the cover slip has the required thickness of 0.17 mm, the object will be imaged perfectly. But if the cover glass thickness deviates from the required target value by 0.04 mm, the objective must be moved 0.032 mm in the direction of the object. This image again will be of very poor quality due to the spherical aberration.

Typically, the problem described above will be solved with the use of correcting objectives. These are objectives with moveable subassemblies of lenses, which are moved along the optical axis. These objectives are designed in such a way that moving these lens assemblies creates spherical aberration. This spherical aberration then compensates for the spherical aberration mentioned in the previous section.

Correcting objectives usually are very complex. In order to facilitate the functionality of creating a specific spherical aberration, additional lens assemblies must be present in the objective. That is why correcting objectives are very cost-intensive. As it is near impossible to move lens assemblies without some mechanical play, correcting objectives often suffer from coma and chromatic errors.

Other solutions are based on the principle of reproducing the image created by the microscope with the use of a complex optical system. Inside this additional system, the correction of the objectionable spherical aberration is performed with the use of moveable lens assemblies or via deformable mirrors.

BRIEF DESCRIPTION

Starting with the disadvantages of existing state of the art solutions, the invention's primary task is to create a cost-effective solution for the spherically corrected imaging of three-dimensional objects, which works without additional lens assemblies.

This task is achieved by a microscope of the type described above, with the characteristics of patent claim 1. Advantageous design variants are listed in the sub claims 2 to 6.

In the invention, the thickness of the immersion medium ($\Delta s$) and the position of the primary intermediate image of the object ($\Delta s'$) can be variably modified, where the following relationships exist between the variation of the object position ($\Delta z$), the variation of the thickness of the immersion medium ($\Delta s$) and the variation of the position of the primary intermediate image ($\Delta s'$):

$$\Delta s = g \cdot \Delta z \frac{n}{n'} \cdot \frac{\left(\sqrt{1-\left(\frac{NA}{n}\right)^2}\right)^{-1} \pm \frac{1}{2}\left(\frac{NA}{n}\right)^2 - 1}{\left(\sqrt{1-\left(\frac{NA}{n'}\right)^2}\right)^{-1} \pm \frac{1}{2}\left(\frac{NA}{n'}\right)^2 - 1} \quad (1)$$

and $$\Delta s' = k \cdot \beta^2 \frac{\Delta z}{n} \left[1 - g \cdot \left(\frac{n}{n'}\right)^2 \frac{\left(\sqrt{1-\left(\frac{NA}{n}\right)^2}\right)^{-1} \pm \frac{1}{2}\left(\frac{NA}{n}\right)^2 - 1}{\left(\sqrt{1-\left(\frac{NA}{n'}\right)^2}\right)^{-1} \pm \frac{1}{2}\left(\frac{NA}{n'}\right)^2 - 1}\right], \quad (2)$$

where
NA is the numerical aperture,
n is the refractive index of the embedding medium,
n' is the refractive index of the immersion medium,
β is the magnification of the objective in conjunction with an associated tube lens, in reference to the plane of the primary intermediate image,
Δz is the distance of the object from a target position, and
g and k are constants.

One advantageous variant features a system where the thickness of the immersion medium can be modified by an amount Δs while the position of the image plane is modified by an amount Δs' at the same time. The defined variation of the immersion thickness by Δs and the movement of the image plane by Δs' in conjunction with the aforementioned relationships makes it relatively easy to correct spherical aberrations without arranging additional lenses in the path of the beam.

Preferably, the constants g and k lie between 0.92 and 1.08. Their deviation from a value of 1 should be minimal. The deviation values depend on the remaining aberrations of the objective used.

The operational symbol ± has the following significance in this context:

+, if n<n' and

−, if n≥n'.

BRIEF DESCRIPTION OF THE DRAWINGS

The invention is explained in more detail in the following through the use of exemplary embodiments. In this context, the illustrations show the following.

Figure 1:
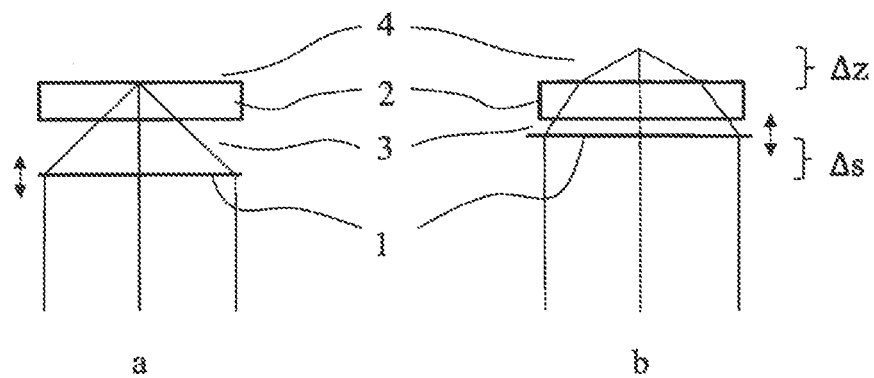
FIG. 1: the schematic depiction of a state of the art solution.

The present disclosure is susceptible of various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, and alternatives falling within the spirit and scope of the disclosure as defined by the appended claims.

DETAILED DESCRIPTION OF ILLUSTRATED EXAMPLES

In illustrations a and b, FIG. 1 shows an objective 1 with β=−100 and NA=1.4 with the designation 100×/1.4 and a cover slip 2, where an immersion medium 3 with a refractive index of 1.518 is located between the cover slip 2 and the objective 1. An embedding medium 4 with a refractive index of 1.456 is applied to the cover slip. If an object, not shown in illustration a, is positioned directly under the cover slip 2 it is imaged perfectly.

However, if the object is positioned at a distance $\Delta z$ (distance of the object from a target position) from the cover slip, as shown in illustration b, and if the objective 1 is moved by a distance $\Delta s$ (thickness of the immersion medium 3) in such a way as to technically create an image at the primary intermediate image plane, this image will be of very low quality due to the great spherical aberration.

Figure 2:
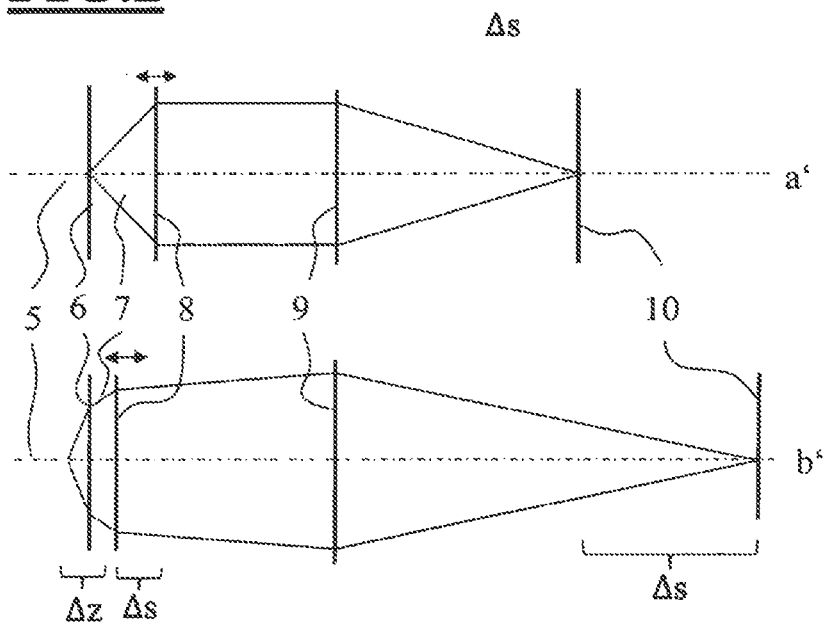
FIG. 2: a schematic depiction of the inventive arrangement of a microscope.

FIG. 2 shows the inventive solution in illustrations a' and b' with an embedding medium 5 with a refractive index n, a cover slip 6, an immersion medium 7 with the refractive index n, an objective 8, a tube lens 9 and the image plane 10.

Furthermore, illustration b' shows the distances $\Delta z$ (distance of the object from a target position), $\Delta s$ (variation of the thickness of the immersion medium 7) and $\Delta s'$ (variation of the position of the primary intermediate image).

A first exemplary embodiment uses an objective 8 with the designation 100×/1.4, an embedding medium 5 (glycerin) with a refractive index n=1.4556, and an immersion medium 7 (oil immersion) with the refractive index n'=1.518. The numerical aperture in this case is 1.386 and the magnification is −100.

If the object, not shown in the illustration, is positioned directly under cover slip 6 will be imaged perfectly.

If the object is positioned 0.02 mm away from cover slip 6, it will be imaged perfectly if the objective 8 is moved 0.027 mm in the direction of the object and at the same time the distance between image plane 10 and the tube lens 9 is increased by 44.3 mm.

This is equivalent to $\Delta z$=−0.02 mm, $\Delta s$=−0.027 mm and $\Delta s'$=44.3 mm. These three values meet the conditions for the aforementioned relationships for the constants g=0.97 and k=1.07. The concrete values for g and k relate to a positive residual aberration of a higher-order spherical aberration.

A second exemplary embodiment uses an objective 8 with the designation 20×/0.8, an embedding medium 5 (water) with a refractive index n=1.334, and an immersion medium 7 (air) with the refractive index n'=1.0. The numerical aperture then is 0.784 and the magnification is −20.

If the object, not shown in the illustration, is positioned directly under cover slip 6 it will be imaged perfectly.

If the object is positioned at a distance of 0.06 mm from cover slip 6, it will be imaged perfectly if objective 8 is moved 0.0175 mm in the direction of the object, and if the distance between image plane 10 and tube lens 9 is reduced by 11.1 mm at the same time.

This is equivalent with $\Delta z$=−0.06 mm, $\Delta s$=−0.0175 mm and $\Delta s'$=−11.1 mm. These three values meet the conditions for the aforementioned relationships for the constants g=1.05 and k=1.01. The concrete values for g and k relate to a positive residual aberration of a higher-order spherical aberration.

A third exemplary embodiment uses an objective 8 with the designation 40×/1.2, an embedding medium 5 (silicone oil) with a refractive index n=1.406, and an immersion medium 7 (water) with the refractive index n'=1.334. The numerical aperture then is 1.17 and the magnification is −40.

If the object, not shown in the illustration, is positioned directly under cover slip 6 it will be imaged perfectly.

If the object is positioned at a distance of 0.04 mm from cover slip 6, it will be imaged perfectly if objective 8 is moved 0.029 mm in the direction of the object, and if the distance between image plane 10 and tube lens 9 is reduced by 11.24 mm at the same time.

This is equivalent with $\Delta z$=−0.04 mm, $\Delta s$=−0.029 mm and $\Delta s'$=−11.24 mm. These three values meet the conditions for the aforementioned relationships for the constants g=1.05 and k=1.05. The concrete values for g and k relate to a positive residual aberration of a higher-order spherical aberration.

A fourth exemplary embodiment uses the objective 8 from the previous example, with the designation 40×/1.2, and an immersion medium 7 (water) with the refractive index n'=1.334. The object is positioned directly under the cover slip 6 with a refractive index of 1.524. But the cover slip is too thick by 0.04 mm.

The object will be imaged perfectly if objective 8 is moved 0.019 mm in the direction of the object, and if the distance between image plane 10 and tube lens 9 is reduced by 20.3 mm at the same time.

This is equivalent with $\Delta z$=−0.04 mm, $\Delta s$=−0.019 mm and $\Delta s'$=−20.3 mm. These three values meet the conditions for the aforementioned relationships for the constants g=1.08 and k=1.045. The concrete values for g and k relate to a positive residual aberration of a higher-order spherical aberration.

The invention claimed is:

1. A system for spherically correcting imaging of a three-dimensional object, comprising:
   a microscope including an immersion medium; and
   an embedding medium configured to hold the three-dimensional object separated from the immersion medium of the microscope by a boundary surface or a cover slip, wherein a thickness ($\Delta s$) of the immersion medium defined by a distance between the cover slip and an objective, and a position ($\Delta s'$) of a primary intermediate image of the three-dimensional object can be variably modified.

2. The system of claim 1, wherein the following relationships exist between a variation of the three-dimensional object position (Δz), a variation of the thickness (Δs) of the immersion medium and a variation of the position (Δs') of the primary intermediate image:

$$\Delta s = g \cdot \Delta z \frac{n}{n'} \cdot \frac{\left(\sqrt{1-\left(\frac{NA}{n}\right)^2}\right)^{-1} \pm \frac{1}{2}\left(\frac{NA}{n}\right)^2 - 1}{\left(\sqrt{1-\left(\frac{NA}{n'}\right)^2}\right)^{-1} \pm \frac{1}{2}\left(\frac{NA}{n'}\right)^2 - 1} \quad (1)$$

and $$\Delta s' = k \cdot \beta^2 \frac{\Delta z}{n} \left[1 - g \cdot \left(\frac{n}{n'}\right)^2 \frac{\left(\sqrt{1-\left(\frac{NA}{n}\right)^2}\right)^{-1} \pm \frac{1}{2}\left(\frac{NA}{n}\right)^2 - 1}{\left(\sqrt{1-\left(\frac{NA}{n'}\right)^2}\right)^{-1} \pm \frac{1}{2}\left(\frac{NA}{n'}\right)^2 - 1}\right], \quad (2)$$

where
n is a refractive index of the embedding medium,
n' is a refractive index of the immersion medium,
ß is a magnification of the three-dimensional object in conjunction with an associated tube lens, in reference to a plane of the primary intermediate image,
Δz is a distance of the three-dimensional object from a target position, and g and k are constants.

3. The system of claim 1, wherein the thickness (Δs) of the immersion medium and the position (Δs') of the primary intermediate image can be modified at the same time.

4. The system of claim 1, wherein the objective can be moved in the direction of the three-dimensional object in order to modify the thickness (Δs) of the immersion medium.

5. The system of claim 2, wherein the constants g and k have a value between 0.92 and 1.08.

6. The system of claim 2, wherein the operational symbol ± has the following significance:
+, if n<n' and
−, if n≥n'.

* * * * *